Jan. 23, 1968           J. SCHMIDT           3,365,311

METHOD OF PROCESSING PACKAGED FOOD PRODUCTS

Filed July 22, 1966

INVENTOR.
JOHN SCHMIDT
By

United States Patent Office 3,365,311
Patented Jan. 23, 1968

3,365,311
METHOD OF PROCESSING PACKAGED FOOD PRODUCTS
John Schmidt, 322 Greenwood Ave.,
Jenkintown, Pa. 19046
Continuation-in-part of application Ser. No. 558,173, May 16, 1966. This application July 22, 1966, Ser. No. 586,901
4 Claims. (Cl. 99—214)

ABSTRACT OF THE DISCLOSURE

A method of proceeding mobile food products in sealed thin-walled containers in which means are provided for preventing distortion of the containers by maintaining a residual buffering pressure on the containers. The containers are subject to end-over-end agitation within the retort. Air at a buffering pressure is initially introduced into the retort. The cooking cycle is effected by the introduction of steam which augments the buffering pressure. The cooling cycle is effected by a water spray which condenses the steam and thus removes steam pressure, leaving the orginal buffering pressure to counteract the tendency for the containers to bulge.

---

Figures 1, 2:
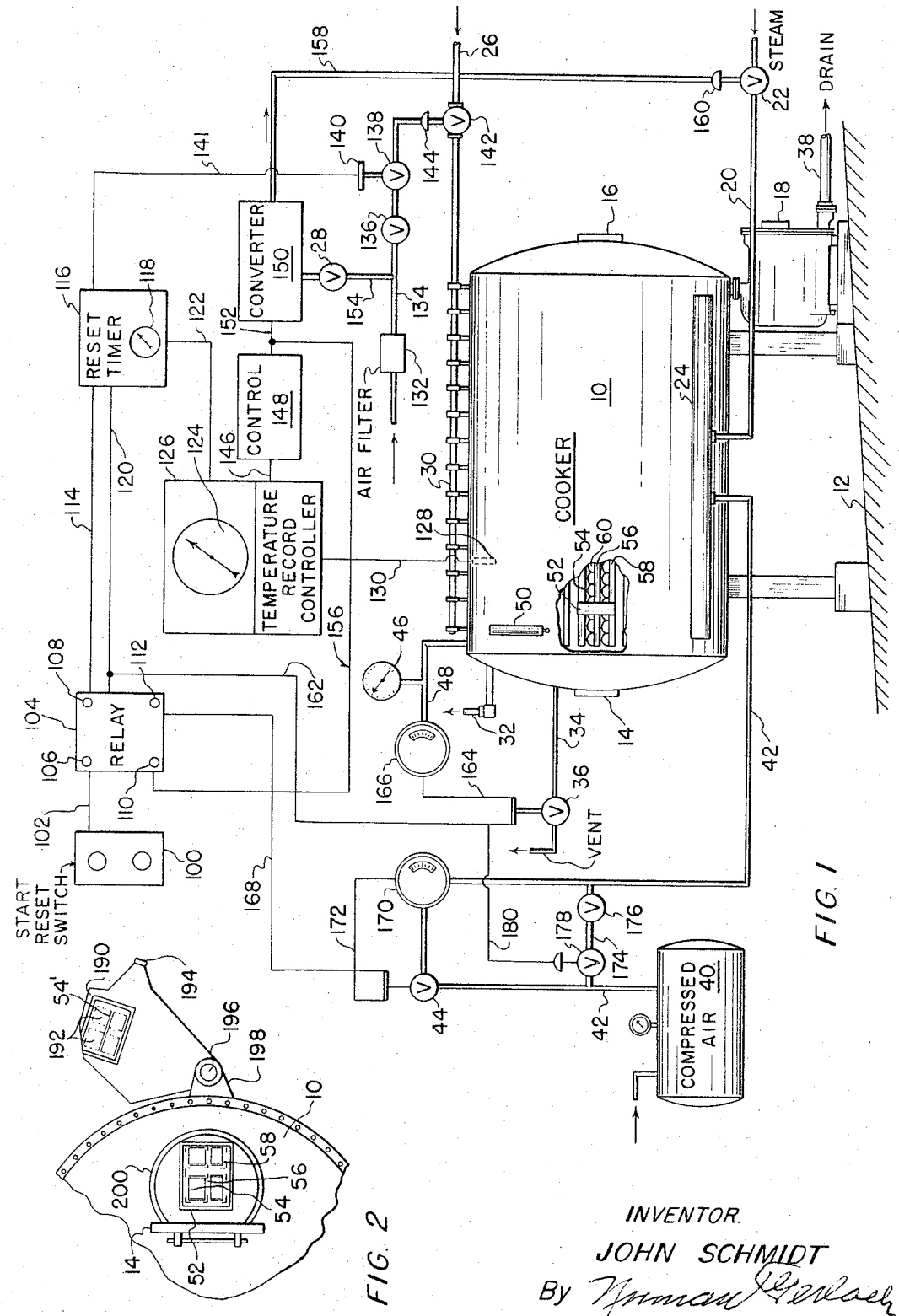

This application for Letters Patent is a continuation-in-part of my now abandoned application Ser. No. 558,173, filed on May 16, 1966, and entitled, "Method of Processing Packaged Food Products."

The present invention relates generally to a method for the heat processing of food products in lightweight, essentially fragile, hermetically-sealed containers, and more particularly to a method of treating food products that are confined in lightweight containers, such, for example, as sealed metal containers, with a vaporous heating medium wherein a vaporous diluent is used as a pressure buffer or cushion on carbonated products during the entire treatment cycle and on non-carbonated products after the cooling operation reaches a predetermined temperature. The invention is directed primarily to a method which utilizes manual or automatic control of the rate introduction of the heating medium and diluent in order to attain shorter retort cycles at maximum heat transfer rates and shorter cooling cycles with minimum danger of rupture of the lightweight metal containers in which the food products are packaged or combined.

The processing of foodstuffs or products in sealed cans by heating the same in a stationary retort to a specified sterilizing and cooking temperature is well known in the art. The process is best conducted by heating the sealed metal cans and their entire contents to the desired sterilization temperature as quickly and as uniformly as possible and then terminating the thermal processing cycle by a cooling step in order to lower the internal temperature of the can contents rapidly. This rapid heating and cooling of the contents of the cans are most desirable in order that the finished food product will be of the highest quality as far as color, flavor, odor, texture, and nutritive value are concerned. Furthermore, such rapid heating and cooling reduces the processing and cooling time and enables high plant operating efficiency and economy.

Proper agitation of the sealed cans during retorting is known to hasten heat transfer. Retorts have been developed which bodily rotate the sealed cans with respect to their longitudinal axes in end-over-end fashion. The latter technique is described and illustrated in U.S. Patent No. 2,517,542 and achieves the desired results by causing the headspace bubbles within the sealed cans to move substantially through the contained mobile food products upon rotation in a manner to provide maximum mobility to the contents and thus accelerate heat transfer. The present invention is concerned with a method for conducting this kind of agitation and with a means for loading and unloading a retort wherein the cans are subjected to end-over-end agitation, such a retort being disclosed in detail in United States Patent No. 3,020,825, granted to me on Feb. 13, 1962, and entitled, "Canning Retort With End-Over-End Agitation."

Although the foregoing method is entirely satisfactory and accomplishes its intended purposes of producing high quality food products in sealed containers with substantial reductions in retort time and attendant costs, and although other satisfactory treating processes or methods which are improvements thereon have been developed, there are still numerous problems which place serious limitations upon this type of food processing or treatment. Paramount among these problems is the inability to utilize sealed metal containers made from lightweight body stock and lightweight end stock; to use new types of closures for cans; to accommodate fast growing use of aluminum containers for many comestibles, including foods and beverages; and to use metal foil packages and easy opening tear-off or scored end closures for many products requiring cooking and sterilization. Additionally, there are now under development various containers and methods for canning carbonated beverages in these new lighter weight more fragile sealed containers wherein the problems are accentuated. Included among these innovations are drawn aluminum cans, thin lightweight tin plate cans and the like for many types of materials including bacteriologically perishable soft drinks, flavored milk drinks and beer which carry 1 to about 3 volumes of carbonation. These developments in packaging are motivated by greater economies in packaging costs, the introduction of double reduced and T H steel or tinplate and the reduction of the thickness of can body stock to a minimum performance level as well as the inherent improvement in the quality of the thermally processed products.

Under ordinary conditions, these new lightweight containers require special provisions for packing, processing and handling. Their use is practically prohibitive for some thermal processing and cooling cycles. Where any attempt is made to cool the containers in order quickly to terminate the cooking and sterilization process or cycle, still retort processing is very difficult to control. The obvious reason for this is that the new lightweight metal containers are not designed to withstand the pressure differentials inside and outside of the container. These operations thus result in severe buckling or bursting of the containers.

According to the present invention, there has been developed a method for effectively and efficiently retorting materials in relatively fragile, lightweight containers, the method being such that the containers undergoing treatment are, at no time, subjected to unduly high internal and external differential pressures which, otherwise, would result in rupture of the containers. Another feature of the present invention is the provision of a method which involves heat treating food products in economical, lightweight containers, the method requiring less man power than previous methods, being economical, requiring a minimum amount of control, and being based on the discovery that the use of a gaseous diluent mixed with the heating medium provides an automatic cushion against sudden or incremental pressure changes in the heating zone. In one aspect of this invention, the method can be carried out by determining the pressure differential or pressure change which will cause the rupture or paneling (temporary or permanent) of a given lightweight container to be subjected to heat treatment, and introducing or maintaining continuously in the retort such an amount of cushioning gas as to prevent the creation or build-up of such pressure differential or pressure change.

It is a primary object of the present invention to provide an improved method for the heat treatment of food products or other materials that are packaged and sealed in minimum strength, economy containers.

A further object of the invention is to provide a method for the heat treatment of food products for sterilization, cooking or other purposes while the same are confined in lightweight metal containers, and wherein constant control and cushioning of the pressure or pressure differential in the heat treating apparatus or retort and in the retort-enveloped containers are provided.

A still further object of the invention is to provide a method for the heat treatment of packages foodstuffs and beverages (carbonated or non-carbonated), wherein constant and automatic control of the pressure differential is provided so that any accidental or intentional collapse of the pressure of the heating medium is cushioned to such an established minimum as to prevent or alleviate the buckling or bursting of the containers.

Other objects and advantages of the invention, not at this time enumerated, will become readily apparent as the following description ensues.

The present method and an exemplary form of apparatus by means of which the method may be carried out, are described in this specification with reference to the accompanying one sheet of drawings in which:

FIG. 1 is a schematic diagra mof the aforesaid apparatus with its automatic control system, parts of the apparatus (retort) being broken away for illustrative purposes; and FIG. 2 is a fragmentary view of the charging end of the apparatus.

Before referring to the drawings, a brief description of the method aspect of the present invention will be given. A food product or material to be heat-treated within a container of the minimum performance level and of the type heretofore described is subjected to the following method steps wherein reference to a single container is intended to include the simultaneous treatment of a plurality of containers as will subsequently be described, particularly in relation to the drawings.

(1) The container is placed in an enclosed heating zone which is equipped with pressure sensing means, temperature sensing means, means for introducing a gaseous or vaporous heating medium, means for introducing a permanent inert gaseous material which is not liquifiable under the temperature changes contemplated to take place in the heating zone with or without means for introducing a cooling medium, and means for withdrawing any condensed heating medium.

(2) The heating zone is pressurized to a threshold or cushion pressure of sufficient magnitude that the difference between the threshold pressure and the highest pressure attained in the heating step is insufficient to cause damage to the container, by introduction of air, nitrogen, carbon dioxide, or other inert gas under said threshold pressure.

(3) Simultaneously therewith or following step 2, the introduction of fluid heating medium in the form of steam is begun.

(4) The heating zone and contents of the container are brought to the desired temperature for the required length of time and under the desired pressure above the threshold or cushion pressure.

(5) The instroduction of heating medium is terminated or reduced to begin the cooling cycle with or without the introduction of a cooling medium.

(6) The temperature of the heating zone and container is allowed to fall and simultaneously the pressure in the heating zone is reduced, until the pressure reaches that of the gaseous non-condensable cushioning medium.

(7) The temperature and pressure are allowed to continue dropping within the heating zone or until the pressure is approximately atmospheric and the container is adequately cooled.

By conducting the method in the foregoing manner, any accidental or intentionally induced temperature and pressure reduction in the heating zone during any of the steps is prevented from causing damage to the container by the presence of the inert non-condensable gas. If a quenching spray of water is used in order suddenly to drop the temperature and pressure, the latter can only fall to the threshold pressure which in accordance with the method is sufficient to prevent damage to the container.

The method of the present invention is further illustrated by the following example:

Beer in 211 x 413 cans can be pasteurized as follows:

| | | |
|---|---|---|
| Carbon dioxide, by volume approx. | | 2.8 |
| Closing temperature, approx. | ° F. | 40 |
| Internal pressure in can | p.s.i. | 15 |
| Pasteurizing temperature | ° F. | 150 |
| Internal pressure in can | p.s.i. | 110 |
| Air presure in retort | p.s.i. | 40 |
| Cooling temperature | ° F. | 75 |
| Internal pressure in can | p.s.i. | 50 |
| Come up time | min. | 3.0 |
| Holding time | do | 2.0 |
| Cooling time | do | 2.0 |
| Total Time Cycle | min. | 7.0 |

From the foregoing, it is apparent that the present method provides a cushion of pressurized air in the heating zone to which is added the partial pressure of the heating medium, to maintain the over-all internal pressure of the retort. Heat treating temperatures well below incoming steam or treating zone temperature are attained at short contact times while heat treating temperatures approaching incoming steam temperature or treating zone temperature are attained with longer contact times. These time and temperature cycles are dependent upon the particular food product being treated and the desired result, i.e., sterilization, coagulation, cooking, polymerization, etc.

The pressure of the air in the treating zone is or may be established before the processing or heat treating begins and the pressure or cushion of air or other inert gas is maintained throughout the thermal processing cycles and also through all or any part of the cooling cycle, depending upon whether the product being processed is or is not carbonated. The invention relates primarily to the maintenance of pressure, i.e., certain minimum pressure below which the container or package being treated cannot fall if it is to remain undamaged.

To further illustrate the method, it is pointed out that if beer were to be pasteurized within a pressurized retort, the pressure resistance of the ends of the can could be lowered from that to meet the highest pressure of pasteurization to that to meet the highest pressure during normal merchandising. Specifically, this is a reduction in pressure of from 95 lbs. internal pressure before buckling to 50 lbs. Based on today's steel prices, this results in an appreciable reduction in the cost of the can ends. For example, with cans having steel ends, there would be a savings of $0.42 per 2,000 can ends or per 1,000 cans.

The invention is also applicable to so-called tear tab, easy opening types of cans which are employed for a number of canned food products, including dog and cat foods. The majority of these can ends are .009 inch thick and require a "glass' still cooker process with proper gas counter-pressure to prevent distortion from the internal pressure in the cans during the "blow off" at the end of the heat processing cycle prior to cooling. There is no automatic cooker or retort available for applying proper counterpressure to such cans or containers during thermal processing to protect these fragile ends.

For regular retorts, .0145″ thickness metal is required even with semi-solid products, like Vienna sausage. The counterpressure and agitation of the present method offers a more efficient means of processing the can as well as an automatic method of pressure control.

The method of this invention is particularly applicable to the processing of foodstuffs, milk, carbonated beverages, non-carbonated beverages, and beer. In the processing of carbonated beverages, a particular problem arises due to the increase of internal pressure of the carbon dioxide in the can due to heating. Thus, in heat treating such a product without counterpressure, the container (can) must be quite strong to withstand this additional pressure. The necessary excess pressure cannot be obtained from steam alone, especially where lower processing temperatures are desired. Even at low temperatures, i.e., at 160° F. and without any steam present, the absolute internal pressure may exceed 120 p.s.i.g. in a carbonated beverage can. Thus, processing with steam under pressure is impossible, though processing with a low steam temperature requiring a longer processing time is possible. By pressurizing the treating retort first with air to compensate for any excess pressure that will develop inside the can and by using steam at 21 p.s.i.g. and at 260° F., an internal pressure of approximately 135 p.s.i.g. can be developed in a beverage can containing 2.8 carbonation. By pressurizing the treating retort with 50 lbs. of air pressure and 21 lbs. of steam pressure (from a 71-lb. source), a compensating pressure of 71 lbs. is developed which prevents damage to the can while at the same time obtaining the desired temperature of 260° F.

Referring now to the drawings in detail, and in particular to FIG. 1, the apparatus for practicing the present method and the automatic or manual control system therefor are shown diagrammatically therein, the heating vessel or retort 10 being shown as being set at a slight angle on the floor 12 of the building or other establishment in which the apparatus is installed. The retort 10 has a feed door 14 at one end thereof and a discharge door 16 at its other end. Steam from a suitable source such as a boiler (not shown) is supplied through a line 20 which has an air-operated control valve 22 and leads to a steam inlet manifold 24 adjacent to the retort. A water line 26 under the control of a valve 142 is connected to a water inlet manifold 30 adjacent to the retort. Said manifolds 24 and 30 are in communication with the interior of the retort and are adapted to subject the interior of the retort 10 to high temperature steam and cooling water, respectively, as is known in the art. The retort 10 is equipped with a standard or conventional safety blow-off valve 32. A line 34 connects the interior of the retort 10 to a solenoid-operated vent valve 36 by means of which the retort interior may gradually be bled to the ambient atmosphere. At the bottom of the retort 10 a line 38 constitutes a vent or outlet for condensate and cooling water, and such line is controlled by a trap 18.

Compressed air for the continuous control of the heat treatment in accordance with the present invention is provided by way of a compressed air storage tank 40 which is connected to the retort through the manifold 24 by a line 42 having a solenoid-operated control valve 44. A pressure gauge 46 is connected to the retort 10 via a line 48, and a thermometer is shown at 50 to sense the internal temperature of the retort.

Referring now to the partial cut-away view through the side of the retort a rotatable carrier rack 52 serves to support a plurality of spaced guide tracks 54, 56 and 58 upon and between which the containers 60 rest. Since the retort 10 normally slopes downwardly from the feed door 14 to the discharge door 16 and the tracks 54, 56 and 58 are likewise inclined, the containers (in this instance, cylindrical cans) are free to roll into the retort for charging and out of the retort for discharging. The cans are held so that their longitudinal axes are radially disposed in the rotatable rack 52 in order to provide end-over-end rotation of the cans during rotary or drive movement of the carrier rack 52. The mechanism for such rotation in addition to the hydraulic means for moving the rack 52 incrementally to position the tracks before the doors 14 and 16 have been omitted for simplicity since the same constitutes no part of the present invention.

The manual operation of the various items or parts thus far described may be carried out as follows, the function of the parts and their sequential or simultaneous operation being thus related to the method as set forth in the foregoing example, without undue limitation therein in respect to the features of the invention to be subsequently described.

The retort 10 is filled with the containers 60 containing a mobile food product or other material to be heat-treated. The feed door 14 is closed after charging of the retort with the containers. The valve 22, 138, 142, 178 and 44 are thereafter closed and the apparatus is at starting condition. The vent valve 36 is opened to maintain static conditions in the retort 10, and upon start-up the vent valve 36 is closed. The valve 44 is then opened and air at 75 p.s.i.g. passing through the line 42 and the manifold 24 brings the interior of the retort 10 to a desired air pressure, as indicated by the gauge 46. Thereafter the valve 44 is closed and the valve 178 is opened to supply a constant air pressure through line 174 under regulation by a valve 176. Steam at a pressure of 100 p.s.i.g. from the boiler (not shown) is allowed to pass through the line 20 into the manifold 24 by opening the valve 22. This brings the pressure inside the retort 10 to the pressure established for the product. Other means are available and known to carry out the foregoing steps.

The retort 10 is maintained at the pressure of 100 p.s.i.g. by throttling the valve 22 sufficiently to supply steam at a rate sufficient to bring the temperature, as indicated by the thermometer 50, and a temperature recorder controller 126 to the desired level, and for the time of heat contemplated for the food products in the containers 60, during which time the rack 52 may be rotated. The vent valve 36 is opened as required.

At the end of the heat cycle, the valve 22 is closed and the retort is allowed to come to ambient temperature while still under the influence of air which is introduced continuously in order to maintain a desired pressure cushion of that established for the particular containers and the food products therein. With the retort 10 at ambient temperature, the air pressure therein is reduced, as by gradual bleeding through the vent valve 36 until the apparatus or system is at atmospheric pressure. The temperature of the containers 60 may be ambient or above ambient temperature, i.e., 100° F., at this time to allow rapid air dry upon removal from the retort. The discharge door 16 is opened and the containers are thereafter removed.

Instead of allowing the retort 10 to come to ambient temperature through gradual loss of heat, the apparatus can be operated to employ a cooling step. After the time-temperature heat cycle is completed, the steam valve 22 is closed, the valve 178 is left opened to insure the minimum established pressure and the valve 138 is opened which allows air under pressure to be conducted to a control diaphragm 144 and thus open the valve 142 so as to supply through the manifold 30 the interior of the retort with a cooling medium, such, for example, as tap water. This causes within the retort 10 a sudden drop in temperature and pressure which ordinarily would cause the containers 60 to be subjected to strain due to the fact that the food products therein do not lose their heat immediately. However, the continuous maintenance of air pressure in the retort 10 or the simultaneous admittance of more air to raise the internal pressure to a point approaching the internal pressure of the containers 60 prevents any damage to the containers.

For thin tin plate or aluminum containers or cans, the pressures therein may reach 140 p.s.i.g. If these containers would burst when the internal pressure is 20 p.s.i.g. higher than the outside pressure, air is introduced and maintained throughout the process to bring the external pressure to a point less than 20 p.s.i.g. above said internal pressure. This pressure differential is maintained by continuous application of air pressure throughout the cooling cycle in connection with the processing of can-contained carbonated products. In connection with the processing of non-carbonated products in cans, the air pressure may be released at any predetermined temperature.

The apparatus shown in FIG. 1 includes means for automatic control of the foregoing steps and comprises a start-restart switch 100 which is connected to a source of current (not shown) and is also connected via a conductor 102 to a relay system 104 having relays 106, 108, 110 and 112 therein. The relay system 104 is connected by a conductor 114 to a reset timer 116 having a timing dial 118. The relay 108 is connected to the reset timer 116 by way of a conductor 120.

The reset timer 116 is connected via a conductor 122 to the temperature recorder-controller 126 having a recorder dial 124 which records the response of a thermocouple 128 through a two-wire thermocouple lead wire 130, the thermocouple being located in retort 10. A thermocouple may be installed in one of the containers or in a sample container containing a material or food product having the same thermal properties as the material being treated within the containers.

A forced air system 132 having sufficient pressure to control air-operated valves, i.e., 20 p.s.i.g., is provided. This system may be connected to the compressed air tank 40 through a pressure reduction valve (not shown). The forced air system is connected via a line 134 under control of an air pressure regulator valve 136 to a solenoid-operated valve 138. The latter is controlled by a solenoid 140 which is connected by a conductor 141 and is controlled by the reset timer 116. Said solenoid-operated valve 138 serves to control the valve 142 in line 26 by means of the control diaphragm 144, the valve 142 being an air-operated valve.

The temperature recorder-controller 126 is connected by way of a conductor 146 to a controller 148 which, in turn, is connected to a converter 150 via a conductor 152. A branch line 154 extends between the line 134 and the converter 150, provides for the forced air operation of the converter, and includes in it an air pressure regulator valve 28. A branch conductor 156 leads from the conductor 152 back to the relay 110. An air line 158 extends between and serves operatively to connect the converter 150 and a diaphragm 160 for controlling the steam-control valve 22, the latter being air-operated.

The conductor 120 from the relay 108 has a branch conductor 162 which is connected to the solenoid-operated vent valve 36 and is also connected via a conductor 164 to a pressure actuated control switch 166 now replacing the pressure gauge 46 for automatic control of the apparatus. The relay 112 connects via a conductor 168 to the solenoid valve 44 for controlling the compressed air line 42. A second pressure switch 170 in the line 42 is connected to the solenoid valve 44 by a conductor 172. The air line 174 is essentially a by-pass air line between certain portions of the line 42, includes the air pressure regulator valve 176 and the valve 178, and bridge across the valve 44 and the pressure switch 170. The valve 178 is a solenoid-operated valve and is connected to the conductor 162 and the relay 108 by a conductor 180.

The automatic control system for the apparatus is made ready for operation by adjusting the set point of temperature recorder-controller 126 to the desired maximum temperature, and the internal relays thereof to coincide with the maximum temperature set point and the final temperature of the cycle, i.e., 100° F. or ambient temperature. The valve 176 is adjusted to the required constant amount of air to be continuously bled into the retort 10. The pressure switch 170 having two adjustable pointers is adjusted by means of one pointer to the desired pressure of air to be applied through the action of an internal relay. The second pointer is set at the minimum differential pressure desired, i.e., 6–30 p.s.i. The valve 136 is set to the desired air pressure from the forced air system 132 for the control or limit of the opening of air used to operate the valve 142. The reset timer 116 is adjusted to the desired holding or over-all heating period for the retort 10.

The operation of the system, when adjusted as above, is as follows: The switch 100 is actuated to cause the relay 108 to close the vent valve 36, which is normally open, and also opens the main air supply valve 44 which is normally closed. Air passes through the line 42 into the manifold 24 and the retort 10 becomes pressurized under constant control of the pressure switch 170. When the air pressure reaches the set point for the upper pressure level of the pressure switch 170, the relay therein trips (opens) and the solenoid valve 44 closes, and at the same time, the solenoid-operated by-pass air valve 178 opens, the contacts in the converter 150 close and forced air passes through the line consisting of lines 154–158, opening the valve 22 and allowing steam from the boiler to enter the retort 10.

As steam is introduced into the retort 10, the temperature and pressure therein begin to rise rapidly. A constant, regulated supply of pressurized air is also passing into the retort 10 during the complete cycle to maintain maximum pressure as controlled by the pressure switch 166. When the pressure is at the set point of the switch 166, the relay therein closes and a signal is sent to the solenoid valve 36 to open same. The pressure switch 166 opens and thus closes the valve 36 when the pressure in the retort is at the set point. When the pressure drops 5–6 p.s.i. below the set point, the pressure switch 166 closes the valve 36.

At such time as the pressure rises to the set point of the temperature recorder-controller 126, the internal relay closes and the reset timer 116 is started to initiate the holding period. Simultaneously, the time controller 148 through the converter 150 regulates the valve 22 to control the steam input and maintain a constant temperature during the holding period. At the end of the holding period pre-set in the timer 116, a relay therein opens and the timer is shut off. This automatically opens the relays in the converter 150 and closes the valve 22, closes the relay 108 sending a signal through the reset timer 116 to open the air valve 138, which, in turn, opens the water valve 142 and starts the cooling cycle. At the completion of the cooling cycle, set by the timer 116, an internal relay in temperature recorder-controller 126 closes and the valve 142 is also closed by the opening of the relay 108. This closes by-pass valve 178 and opens the vent valve 36.

The retort 10 is then opened and thereafter the group of containers 60 are successively removed by gravity via the discharge door 16. After reloading of the retort with a new batch of containers, pushing of the reset button of the switch 100 which resets the timer 116, and then pushing of the start button effects initiation of a new cycle.

The loading of the containers 60 into and from the retort 10 is accomplished by a feed assembly which is shown in FIG. 2 and comprises an elongated track 190 having four parallel and grouped channels 192 which are formed by guide tracks 54' and are adapted to hold in an inclined position four lines of containers to be introduced onto the spaced guide tracks 54, 56 and 58 of the rotatable carrier rack 52 in the retort 10. This assembly is held by a support 194 which is rotatably mounted on a shaft 196 in order that it may be swung back and forth between an inoperative position as shown in FIG. 2 and a charging or operative position wherein the lower ends of the channels 192 are aligned with the receiving ends of the aforementioned guide tracks of the rack 52. The shaft 196 is carried by a bracket 198 which is attached to the side of the retort 10 adjacent to the feed door 14. The open position of the feed door 14 exposes a feed port 200 in the adjacent end wall of the retort, and when the feed assembly is in its charging or operative position the lower ends of the channels 192 are in alignment with said feed port. The guide tracks 54 are constructed much the same as the guide tracks 54' shown in connection with the track runway 190. The advantage of this arrangement is that the feed assembly can be swung to the left as shown in FIG. 2 into a position in front of the port 200 in axial alignment therewith and with the guide tracks 54' also aligned with the guide tracks 54, 56 and 58 of the carrier rack 52 so that the cans or containers from the feed assembly can be caused to roll into the carrier rack 52 by gravity due to the downward slope of the retort 10 on the floor 12.

Automatic control has the advantage of safety, convenience, efficiency, low operating cost and maximum flexibility, there being numerous temperature-pressure relationships that can be established to cover a wide variety of food container pressure differential requirements.

The invention is not to be understood as restricted to the details set forth since these may be modified within the scope of the appended claims without departing from the spirit and scope of the invention.

Having thus described the invention what I claim as new and desire to secure by Letters Patent is:

1. In processing food products in hermetically-sealed thin-walled metal containers with small resistance to internal and external pressure differentials, by subjecting said food products in the containers to a predetermined cooking temperature and for a predetermined length of time while continuously moving the containers in end-over-end fashion within a closed heating zone in a retort for the purpose of agitating the food products within the containers, the improvement which comprises: initially supplying a relatively cool inert non-liquefiable gaseous medium under pressure into said retort in sufficient quantity to raise the pressure within said heating zone to a predetermined buffering pressure adequate to prevent outward bulging of the containers when the food products therein attain said cooking temperature, continuing to supply said gaseous medium to said retort at said buffering pressure while simultaneously supplying steam into said retort at a temperature of the order of said cooking temperature and a pressure above said buffering pressure in order to raise the temperature of the heating zone commensurately and thus raise the pressure within said zone to the pressure at which the steam is supplied, continuing to supply said steam and gaseous medium to the retort interior until expiry of said predetermined length of time in order to maintain said latter temperature and pressure within the zone and effect heat transfer through the walls of the container and consequent processing of the food products in the containers, then discontinuing the supply of steam to the interior of the retort at the end of said predetermined length of time, and thereafter causing the residual steam in the retort to be condensed and venting the retort interior to atmosphere in order to relieve said buffering within the retort.

2. The improvement set forth in claim 1 and wherein the food products in the containers are non-carbonated, and venting of the retort interior to relieve the buffering pressure is caused to occur when, during condensation of the steam, the temperature of said food products drops to a predetermined degree.

3. The improvement set forth in claim 1 and wherein the food products in the containers are carbonated, and venting of the retort interior to relieve the buffering pressure is caused to occur only after the steam has been fully condensed.

4. The improvement set forth in claim 1 and wherein the step of causing the residual steam within the retort to be condensed is effected by spraying the interior of the retort with water.

References Cited

UNITED STATES PATENTS

| | | | |
|---|---|---|---|
| 1,447,701 | 3/1923 | White | 99—214 |
| 1,544,304 | 6/1925 | Fenn | 99—214 |
| 1,953,656 | 4/1934 | Mullen | 99—214 |
| 2,517,542 | 8/1950 | Clifcorn et al. | 99—214 |
| 2,536,116 | 1/1951 | Wilbur | 99—214 |
| 3,020,825 | 2/1962 | Schmidt | 99—362 |
| 3,215.538 | 11/1965 | Sada | 99—214 |

HYMAN LORD, *Primary Examiner.*